(12) United States Patent
Mendoza et al.

(10) Patent No.: US 9,397,331 B2
(45) Date of Patent: Jul. 19, 2016

(54) BATTERY GRID PASTING MACHINE AND SYSTEM

(71) Applicant: Wirtz Manufacturing Company, Inc., Port Huron, MI (US)

(72) Inventors: Roel Mendoza, Fort Gratiot, MI (US); John O. Wirtz, Fort Gratiot, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 290 days.

(21) Appl. No.: 14/035,593

(22) Filed: Sep. 24, 2013

(65) Prior Publication Data

US 2014/0083562 A1    Mar. 27, 2014

Related U.S. Application Data

(60) Provisional application No. 61/704,737, filed on Sep. 24, 2012.

(51) Int. Cl.
*H01M 4/20* (2006.01)

(52) U.S. Cl.
CPC ............... *H01M 4/20* (2013.01); *Y02E 60/126* (2013.01)

(58) Field of Classification Search
CPC ........................................................ H01M 4/20
USPC ............... 141/1, 1.1, 32, 33, 83, 89, 98, 280; 29/623.3
See application file for complete search history.

(56) References Cited

U.S. PATENT DOCUMENTS

| 1,485,426 A | * | 3/1924 | Norris | H01M 4/20 141/129 |
| 1,547,523 A | * | 7/1925 | Richards | H01M 4/20 141/186 |
| 1,601,079 A | * | 9/1926 | Norris | H01M 4/20 141/171 |
| 1,626,200 A | * | 4/1927 | Krafft | H01M 4/20 141/164 |
| 1,683,969 A | * | 9/1928 | Garlock | H01M 4/20 141/175 |
| 1,882,300 A | * | 10/1932 | Price | H01M 4/20 141/33 |
| 1,949,526 A | * | 3/1934 | Bible | H01M 4/20 141/171 |
| 1,963,018 A | * | 6/1934 | Goodrich | H01M 4/20 141/171 |
| 2,074,065 A | * | 3/1937 | Stelzer | H01M 4/20 141/280 |
| 2,079,727 A | * | 5/1937 | Wirtz | B22D 25/04 164/342 |
| 2,215,438 A | * | 9/1940 | Radle | H01M 4/20 141/171 |
| 2,218,849 A | * | 10/1940 | Luhrman | H01M 4/20 141/32 |
| 2,252,478 A | * | 8/1941 | Beekman | H01M 4/20 141/32 |
| 2,290,288 A | * | 7/1942 | Mayer | H01M 4/20 141/32 |
| 2,669,376 A | * | 2/1954 | Winkel | H01M 4/20 141/32 |
| 2,762,543 A | * | 9/1956 | Winkel | H01M 4/20 141/125 |
| 2,840,120 A | * | 6/1958 | Lund | H01M 4/20 141/32 |
| 2,873,770 A | * | 2/1959 | Young | H01M 4/20 141/102 |

(Continued)

FOREIGN PATENT DOCUMENTS

GB    2151392 A * 7/1985 .............. H01M 4/20

*Primary Examiner* — Mark A Laurenzi
*Assistant Examiner* — Andrew Schmid
(74) *Attorney, Agent, or Firm* — Reising Ethington, P.C.

(57) ABSTRACT

A battery grid pasting system includes a battery grid pasting machine, a sensing station, and a controller. The battery grid pasting machine includes a conveying apparatus confronting a hopper's dispensing end across a space, and includes a motor actuatable to cause variance of the space and hence variance of the amount of battery paste received on carried battery grids through the space. The sensing station senses a value of a property of a pasted battery grid. And the controller receives the sensed value of the property and controls actuation of the motor based in part or more on the received value.

16 Claims, 8 Drawing Sheets

(56) References Cited

U.S. PATENT DOCUMENTS

| | | | | |
|---|---|---|---|---|
| 3,894,886 | A * | 7/1975 | Pankow | H01M 4/20 118/410 |
| 3,904,040 | A * | 9/1975 | Gilbert | B65G 15/00 206/307 |
| 3,951,688 | A * | 4/1976 | Pankow | H01M 4/04 141/1.1 |
| 4,050,482 | A * | 9/1977 | Ching | H01M 4/20 118/405 |
| 4,079,911 | A * | 3/1978 | Wirtz | B22D 27/04 164/338.1 |
| 4,121,649 | A * | 10/1978 | Wirtz | B22D 25/04 164/269 |
| 4,349,067 | A * | 9/1982 | Wirtz | B22D 11/0602 164/429 |
| 4,415,016 | A * | 11/1983 | McLane | B22D 25/04 164/429 |
| 4,489,772 | A * | 12/1984 | McLane | B22D 11/0651 164/423 |
| 4,509,581 | A * | 4/1985 | McLane | B22D 25/04 164/133 |
| 4,534,404 | A * | 8/1985 | McLane | B22D 25/04 164/135 |
| 4,544,014 | A * | 10/1985 | McLane | B22D 11/0611 164/429 |
| 4,606,383 | A * | 8/1986 | Yanik | H01M 4/20 141/1.1 |
| 4,878,522 | A * | 11/1989 | Ostrander | B05C 1/0813 141/1.1 |
| 4,932,443 | A * | 6/1990 | Karolek | H01M 4/20 141/1.1 |
| 4,973,218 | A * | 11/1990 | Wirtz | B21D 43/20 198/576 |
| 5,062,762 | A * | 11/1991 | Wirtz | B21D 43/20 198/576 |
| 5,099,982 | A * | 3/1992 | Wirtz | B21D 43/20 198/464.3 |
| 5,276,960 | A * | 1/1994 | Wheadon | H01M 2/0242 141/1.1 |
| 5,494,400 | A * | 2/1996 | Mendoza | B65H 29/18 198/817 |
| 5,727,604 | A * | 3/1998 | Koike | B05C 11/02 118/122 |
| 6,279,224 | B1 * | 8/2001 | Wirtz | B23P 21/004 29/711 |
| 6,814,810 | B2 * | 11/2004 | Prentice | H05K 13/0469 118/677 |
| 2002/0182487 | A1 * | 12/2002 | Wirtz | H01M 4/73 429/130 |
| 2009/0229700 | A1 * | 9/2009 | Kanamura | H01M 10/052 141/1.1 |
| 2009/0255604 | A1 * | 10/2009 | Fredrickson | H01M 4/20 141/1.1 |
| 2014/0083562 | A1 * | 3/2014 | Mendoza | H01M 4/20 141/32 |
| 2015/0096645 | A1 * | 4/2015 | Mendoza | H01M 4/20 141/1.1 |

* cited by examiner

FIG. 12

BATTERY GRID PASTING MACHINE AND SYSTEM

REFERENCE TO CO-PENDING APPLICATION

This application claims the benefit of U.S. Provisional Application No. 61/704,737 filed Sep. 24, 2012, which is incorporated herein by reference in its entirety.

TECHNICAL FIELD

This disclosure relates generally to lead-acid battery manufacturing and assembly processes and equipment, and more particularly to battery grid pasting systems and machines.

BACKGROUND

Lead-acid batteries are a common source of electrical energy and are often used as automotive batteries, marine batteries, consumer equipment batteries, industrial batteries, and in other applications. Among other components, lead-acid batteries include numerous plates that are made of lead alloy metal grids with an electrochemically active paste material applied on the grids. Machines are usually used in battery manufacturing and assembly processes in order to apply the paste on the grids. Operators typically make manual adjustments to the machines in order to change the amount of paste applied to the grids so that the amount applied meets the amount desired.

SUMMARY

A battery grid pasting system may include a battery grid pasting machine, a sensing station, and a controller. The battery grid pasting machine may include a frame, a hopper, a conveying apparatus, and a motor. The hopper may be located at the frame, and may have a dispensing end that dispenses battery paste. The conveying apparatus may be supported in part or more by the frame and may confront the dispensing end across a space. The conveying apparatus may carry battery grids through the space to receive battery paste from the dispensing end. The motor may be actuatable to cause variance of the space and hence variance of the amount of battery paste received on the carried battery grids. The sensing station may be located downstream of the battery grid pasting machine with respect to the direction of travel of the carried battery grids. The sensing station may sense a value of a property of a pasted battery grid. The controller may be electrically coupled to the motor and to the sensing station. The controller may receive the value of the sensed property and may control actuation of the motor based in part or more on the sensed property in order to vary the space and hence vary the amount of battery paste received on the carried battery grids.

BRIEF DESCRIPTION OF THE DRAWINGS

Objects, features, and advantages of the present disclosure will be apparent from the following detailed description of exemplary embodiments and best mode, appended claims, and accompanying drawings in which:

DETAILED DESCRIPTION

Figure 1:
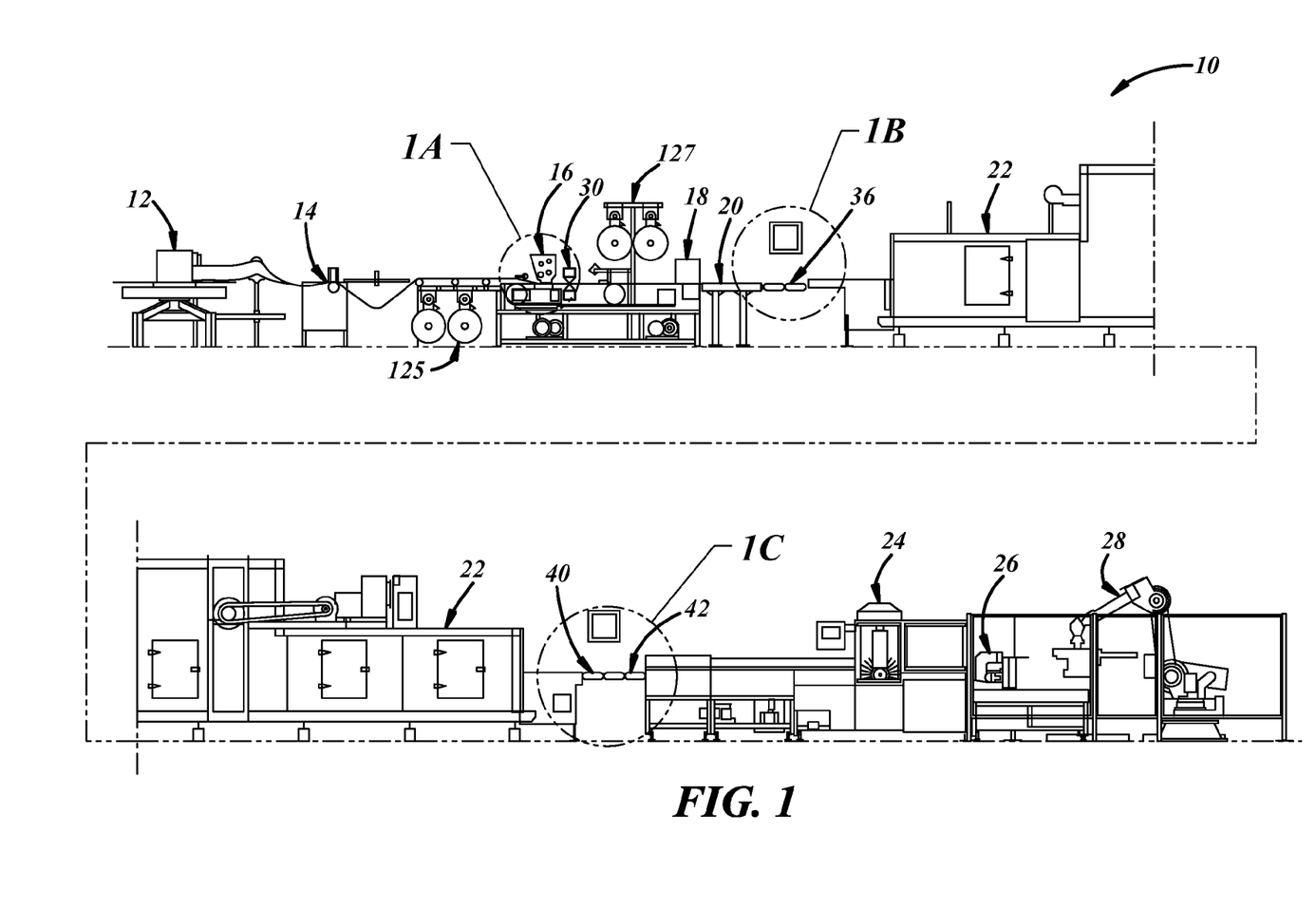
FIG. 1 is a side view of an embodiment of a battery grid pasting system.

Referring in more detail to the drawings, FIG. 1 illustrates a lead-acid battery grid pasting system 10 that is designed and constructed to automatically control the application of an electrochemically active paste material onto grids during the manufacture of battery plates. The battery grid pasting system 10 provides automated paste application to continuously control within close tolerances the amount of paste material applied on a battery grid according to the desired amount of paste in a way that is more accurate, precise, efficient, and consistent than previously known capabilities. These improvements are sought and often required in recently favored battery technologies such as sealed batteries like an absorbed glass mat (AGM) battery and a valve-regulated lead-acid (VRLA) battery, and ultimately lower the cost of manufacturing the sealed batteries. The step of applying paste material to battery grids is but one step in an overall process of manufacture and assembly of lead-acid batteries. The battery grid pasting system 10 can be used in processes that produce batteries for cars, trucks, hybrid vehicles, motorcycles, boats, snowmobiles, golf carts, consumer equipment such as powered wheelchairs, industrial equipment such as forklifts and robots, and for other applications. As an aside, and as used herein, longitudinal refers to a forward and rearward direction in which battery grids are carried and conveyed in the system 10, and lateral refers to a direction that is transverse or at a substantially right angle to the longitudinal direction.

In general, the battery grid pasting system 10 receives battery grids and applies and coats an electrochemically active paste material onto and over them. Before pasting, the battery grids can come from a preceding manufacturing process such as a gravity casting process, a continuous casting process, an expansion-of-metal process, a progressive punching process, or other processes for making the grids. Depending on the process, the battery grids can be in the form of an unbroken continuous strip of metal, with individual grids in the strip typically made from a lead or lead alloy material and designed with an interconnected wire structure having open spaces to receive application of paste material. Also, the strip of battery grids can be in the form of two or more laterally side-by-side battery grids connected to each other—hence, a single battery grid can be integrally connected longitudinally to a frontward battery grid and a rearward battery grid, and laterally to a side battery grid or grids. The battery grid pasting system 10 can have different arrangements, equipment, and machines depending upon, among other considerations, the type and size of the battery grids being pasted, the desired output rate of pasting, and preceding and subsequent steps in the overall processes of manufacture and assembly of lead-acid batteries.

In the embodiment of FIG. 1, the system 10 involves more than a pasting process and includes a dereeler 12 that performs dereeling or unwinding of a spooled strip of battery grids for subsequent handling and processing. A pick-up roller 14 engages the dereeled strip and advances it toward a battery grid pasting machine 16. The battery grid pasting machine 16, as will be described in greater detail below, applies the electrochemically active paste material to each of the individual battery grids in the strip of grids. After pasting, a cutter 18 severs the laterally side-by-side pasted battery grids (if provided in this form), and a diverging conveyor 20 laterally separates and branches the cut and pasted battery grids into separate strips or rows of grids. The pasted battery grids are then carried through a flash drying oven 22 in order to remove moisture from the electrochemically active paste material on the battery grids. Upon exiting the flash drying oven 22, the pasted battery grids are conveyed to a carousel station 24 that indexes a set of them suitably for further processing at a stacker station 26. The stacker station 26 puts the pasted battery grids into a stack, and the stack is then transported usually to an industrial robot 28 for palletization and subsequent processing in the overall manufacturing and assembly process. In other embodiments, the battery grid pasting system 10 can have more, less, and/or different arrangements, equipment, and machines than shown and described here.

Figures 1A, 1B, 1C:
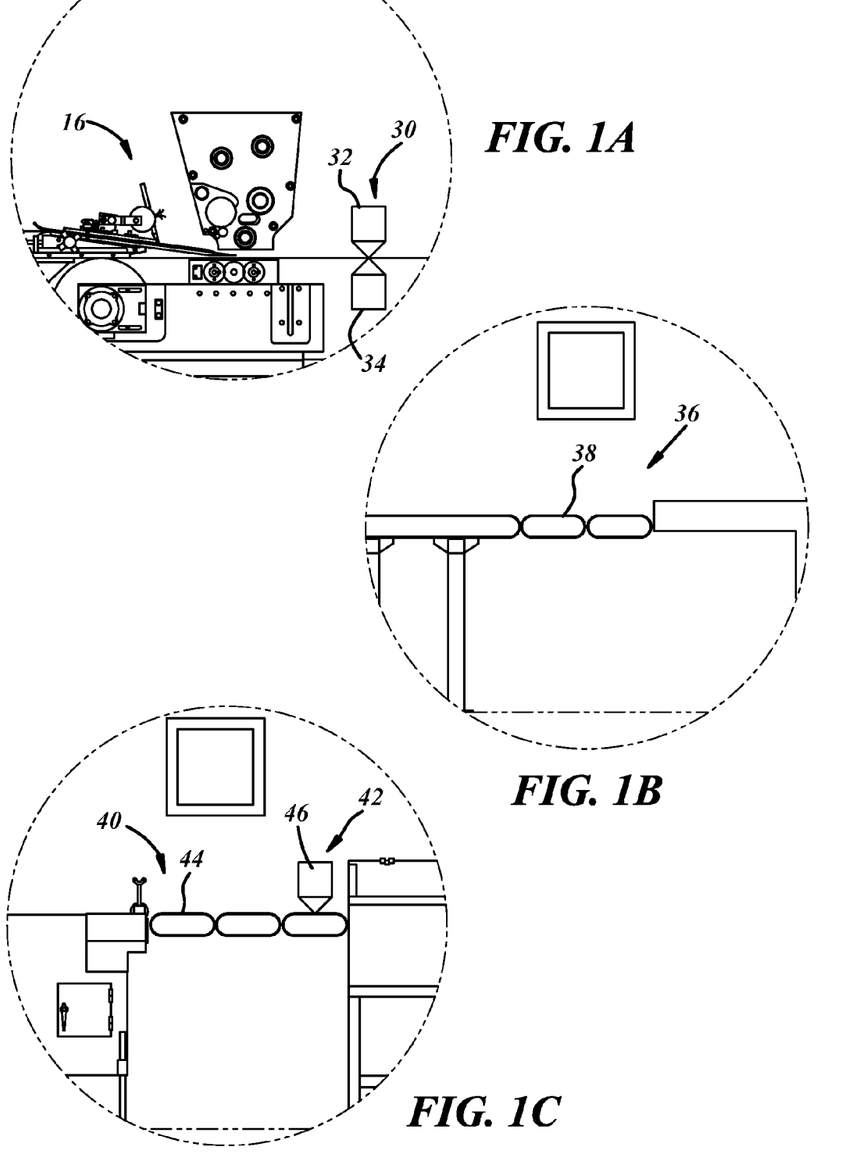
FIG. 1A is an enlarged view of an embodiment of a thickness sensing station of the battery grid pasting system of FIG. 1, taken at phantom circle 1A in FIG. 1.
FIG. 1B is an enlarged view of an embodiment of a weight sensing station of the battery grid pasting system of FIG. 1, taken at phantom circle 1B in FIG. 1.
FIG. 1C is an enlarged view of an embodiment of a weight sensing station and a moisture sensing station of the battery grid pasting system of FIG. 1, taken at phantom circle 1C in FIG. 1.

As mentioned, the battery grid pasting system 10 provides automatic control over the application of paste material by the battery grid pasting machine 16. Particularly, the amount of paste material dispensed from the pasting machine 16 onto the battery grids can be varied and modified based on a sensed property of pasted grids taken downstream of the pasting machine. Referring to FIGS. 1A-1C, this function is performed in part by one or more sensing stations in the battery grid pasting system 10 that senses a property of a battery grid after having the paste applied. In the example of FIG. 1A, a thickness sensing station 30 is located immediately downstream of the battery grid pasting machine 16 and upstream of the flash drying oven 22. The thickness sensing station 30 takes one or more thickness measurements of the overall thickness of individual pasted battery grids. In different forms, the thickness sensing station 30 can have different arrangements and components, and can be of different types. In FIG. 1A, a first thickness sensor 32 is positioned vertically above a path of travel of the pasted battery grids, and a second thickness sensor 34 is positioned vertically below the path of travel. The first and second thickness sensors 32, 34 measure or detect the vertical thickness of the passing pasted battery grids. In one specific example, the first and second thickness sensors 32, 34 are laser sensors supplied by Keyence Corporation of Osaka, Japan (www.keyence.com) and sold under the product name IL Series CMOS Multi-Function Analog Laser Sensor. Other examples are possible.

In the example of FIG. 1B, a first weight sensing station 36 is located immediately downstream of the battery grid pasting machine 16 and upstream of the flash drying oven 22, and can be used in the pasting system 10 alone as the only sensing station or in combination with the thickness sensing station 30. The first weight sensing station 36 takes one or more weight measurements of individual pasted battery grids. In different forms, the first weight sensing station 36 can have different arrangements and components, and can be of different types. In FIG. 1B, a first weight scale 38 is positioned to receive the pasted battery grids and measure the weight of the grids. In one specific example, the first weight sensing station 36 has a checkweigher supplied by Mettler Toledo, LLC of Columbus, Ohio, U.S.A. (www.mt.com). Other examples are possible.

In the example of FIG. 1C, a second weight sensing station 40 is located immediately downstream of and adjacent the flash drying oven 22 and a moisture sensing station 42 is located immediately downstream of the second weight sensing station. The second weight sensing station 40 and the moisture sensing station 42 need not be used together in the pasting system 10 as shown, and can be used alone as the only sensing station or in combination with each other and with the other sensing stations previously described. Similar to the first weight sensing station 36, the second weight sensing station 40 can have a second weight scale 44 which can be a checkweigher supplied by Mettler Toledo, LLC. The moisture sensing station 42, on the other hand, takes one or more moisture content measurements of individual pasted battery grids downstream of the flash drying oven 22. In different forms, the moisture sensing station 42 can have different arrangements and components, and can be of different types. As shown in FIG. 1C, the moisture sensing station 42 has a moisture sensor 46 that is positioned vertically above the path of travel of the pasted battery grids and measures or detects the moisture content of the grids. In one specific example, the moisture sensor 46 is a moisture analyzer supplied by Moisture Register Products (a division of Aqua Measure Instrument Company) of Rancho Cucamonga, Calif., U.S.A. (www.aquameasure.com), and sold under the product name 910-sT SMART Touch Moisture Analyzer. Other examples are possible.

Figure 2:
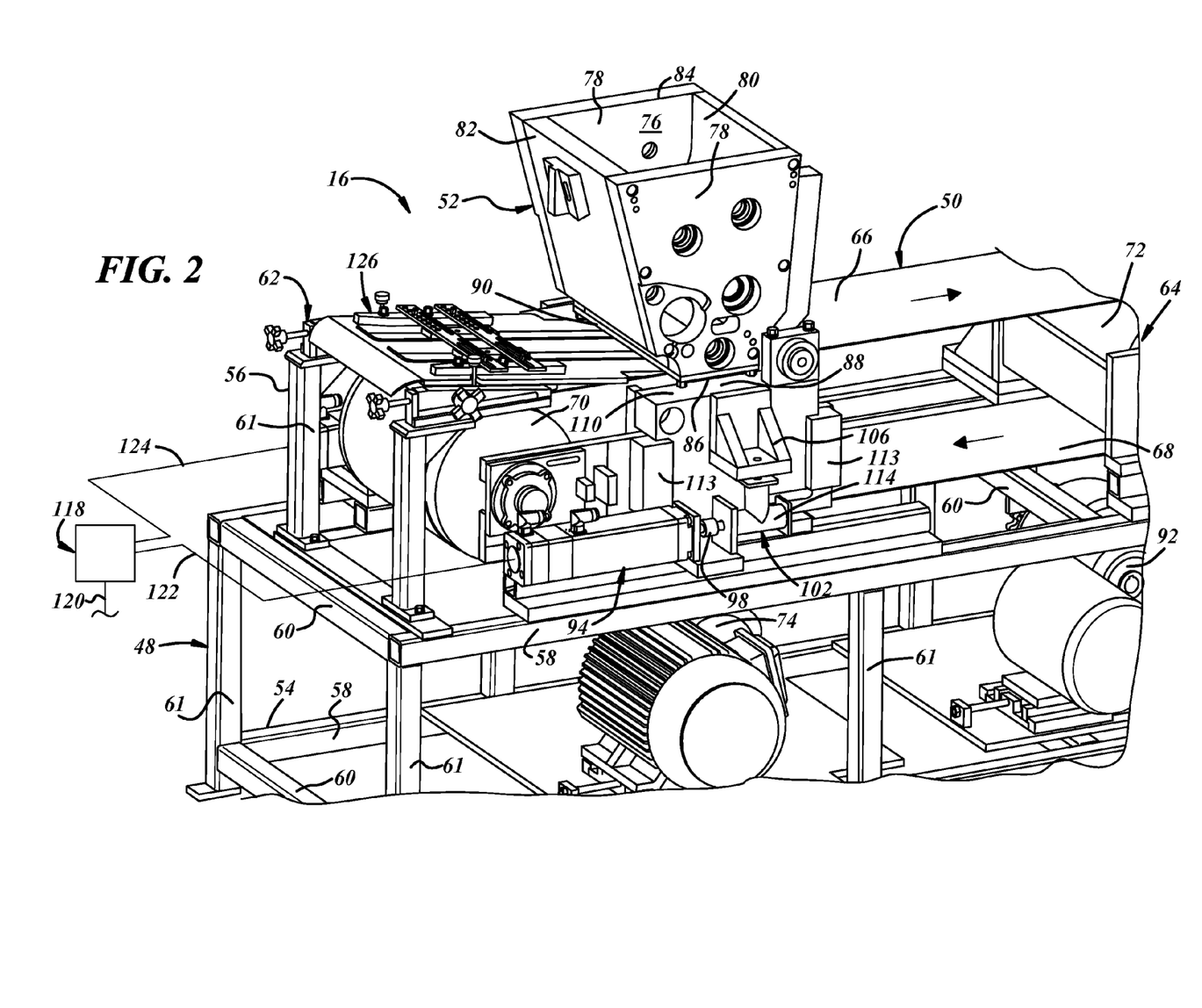
FIG. 2 is a perspective view of an embodiment of a battery grid pasting machine of the battery grid pasting system of FIG. 1.
Figure 3:
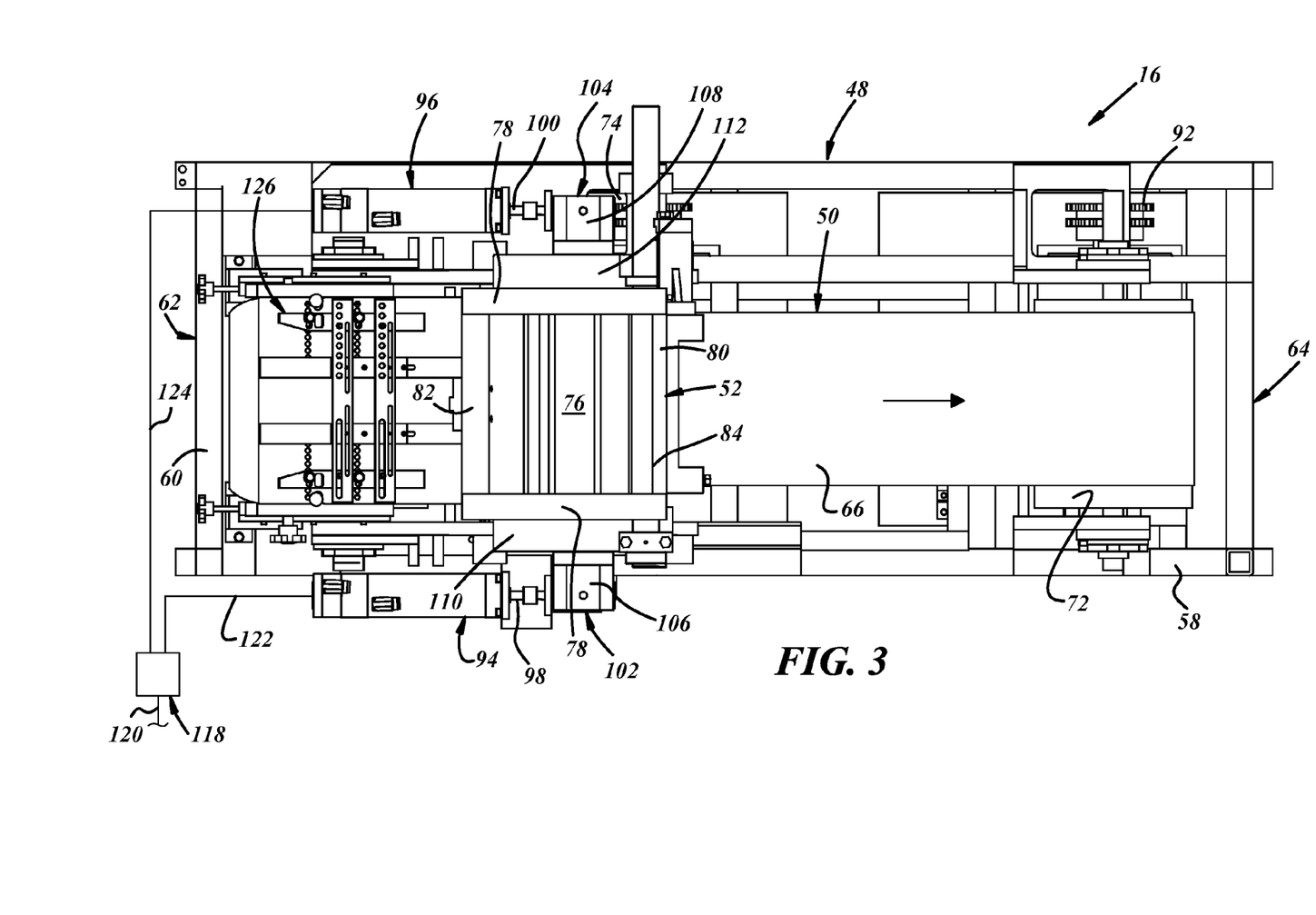
FIG. 3 is a top view of the battery grid pasting machine of FIG. 2.

Referring now to FIGS. 2 and 3, the battery grid pasting machine 16, in response to a controller receiving inputs from the one or more sensing stations, provides automated control of the amount of paste material applied to the battery grids. The battery grid pasting machine 16 can have different designs, constructions, and components, depending upon—among other considerations—the form and type and size of the battery grids being pasted, the desired output rate of pasting, and preceding and subsequent steps in the battery grid pasting system 10. In the first form shown in FIGS. 2 and 3, the pasting machine 16 includes a frame 48, a conveying apparatus such as a belt 50, a hopper 52, one or more motors, and one or more connectors. The frame 48 provides a structural skeleton for the pasting machine 16 and physically supports other components of the machine. In FIGS. 2 and 3, the frame 48 includes a base 54 and a top 56 that are interconnected to each other and made up of numerous side members 58, cross members 60, and vertical members 61. The side, cross, and vertical members 58, 60, 61 can be connected to one another via brackets, bolting, welding, or other fastening techniques. Further, the frame 48 has an entry end 62 for receiving incoming battery grids without paste, and has an exit end 64 for outgoing battery grids with paste.

Still referring to FIGS. 2 and 3, the conveying apparatus, in this example the belt 50, is supported near the top 56 of the frame 48 and is used to carry battery grids longitudinally through the pasting machine 16 from the entry end 62 to the exit end 64 and underneath the hopper 52. Different types of conveying apparatuses can be used including a single wide endless belt of metal material such as stainless steel, as shown in this form; other forms could include plastic, rubber, or cloth belts. Still, in other embodiments, the conveying apparatus could be a beltless conveying apparatus with a set of pinch rolls that move and eject the battery grids underneath the hopper 52. The arrows in FIGS. 2 and 3 represent the directions of movement of the belt 50 along an upper run 66 and a lower run 68 thereof during a pasting operation. A number of rollers support, engage, and provide movement to the belt 50. For instance, the belt 50 is wrapped partly around an entry end roller 70 as belt movement transitions from the lower run 68 to the upper run 66, and likewise the belt is wrapped partly around an exit end roller 72 as belt movement transitions from the upper run to the lower run. Additionally, one or more intermediate rollers (not shown) can be located longitudinally between the end rollers 70, 72 and near or directly beneath the hopper 52 in order to support and engage the belt 50 thereat. The rollers can be mounted on shafts with bearings to facilitate rotation of the rollers journalled on the shafts. To drive the belt 50 and impart movement, a belt motor 74 supported at the base 54 can be interengaged with the entry end roller 70 via a chain and sprocket assembly engagement. The belt motor 74 can have an integrated gear reducer. The exit end roller 72 and intermediate rollers can be idler rollers not driven directly by the belt motor 74. Other driving assemblies and engagements are possible in other forms.

Figure 9:
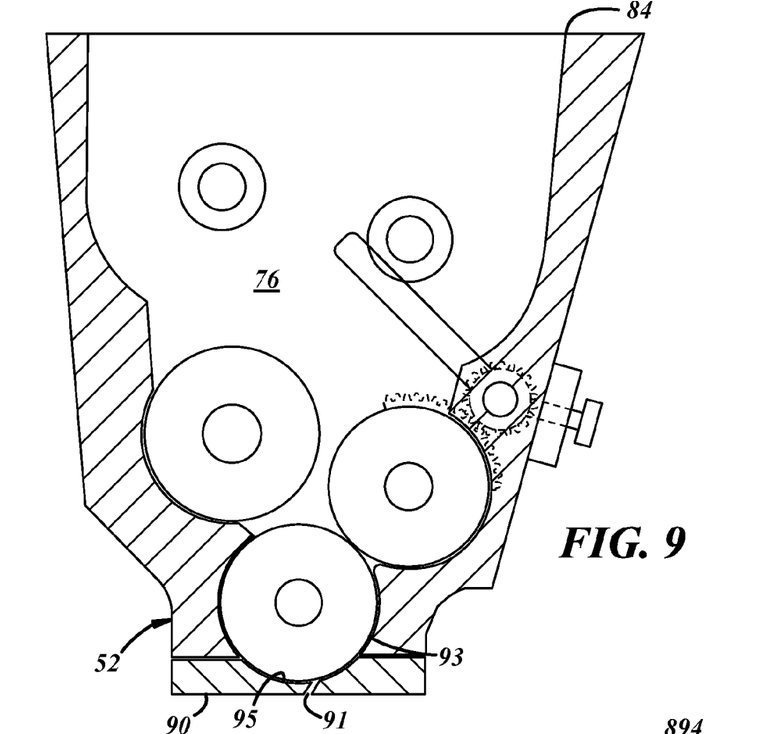
FIG. 9 is a sectional view of an embodiment of a hopper of a battery grid pasting machine.

The hopper 52 is supported on the top 56 of the frame 48 and is mounted vertically above the upper run 66 of the belt 50, holds electrochemically active paste material, and dispenses the paste material onto battery grids carried on the belt 50 beneath the hopper 52. Still referring to FIGS. 2 and 3 and also referring to FIG. 9, the hopper 52 includes four walls that define an interior 76 that receives the paste material—two sidewalls 78, a back wall 80, and a front wall 82. An open top 84 accepts paste material for filling the interior 76, and an oppositely located dispensing end or bottom 86 directly confronts the upper run 66 vertically above and laterally across the belt 50 to define a space 88 between them through which battery grids are carried beneath the dispensing end. The space 88 spans laterally across the belt 50 for a lateral width sufficient for the passing battery grids. At the dispensing end 86 and immediately over the space 88, an orifice plate 90 is mounted to a bottom of the hopper 52 and, with the exception of an orifice slot 91 defined in the plate, closes the bottom and separates the interior 76 from the space 88. The orifice slot 91 communicates the interior 76 of the hopper 52 with the space 88. To keep the paste material in a mixed and somewhat agitated state and continuously fed through the orifice slot 91 as desired during operation, numerous internal rollers and paddles can be rotatably mounted to the sidewalls 78 and located in the interior 76 submerged in the paste. A paste delivery roller 93, in particular, can rotate partially in a complementarily-shaped depression 95 formed in the orifice plate 90 near the orifice slot 91 so that the paste material is more readily dispensed through the slot. To drive the internal rollers and paddles to impart rotational movement, a hopper motor 92 supported at the base 54 can be interengaged with the rollers and paddles via a chain, sprocket, and drive train assembly. The hopper motor 92 can have a gear reducer. Other driving assemblies and engagements are possible in other forms.

The one or more motors are supported about midway between the base 54 and the top 56 of the frame 48 and are used to vary the vertical extent of the space 88 defined between the hopper 52 and the belt 50. Different types and arrangements of motors can be used, including a first servo rotary actuator 94 and a second servo rotary actuator 96 as shown in FIGS. 2 and 3. The first servo rotary actuator 94 is installed and located on one lateral side of the belt 50 and hopper 52, while the second servo rotary actuator 96 is installed and located on the other lateral side of the belt and hopper. Here, the first and second servo rotary actuators 94, 96 are mechanically coupled to the hopper 52 and when actuated cause the hopper to move vertically up or down and away or toward the belt 50 hence varying the extent of the space 88 in the vertically upward and downward directions between the hopper and the belt. As will be known to skilled artisans, servo rotary actuators generally include drive shafts or rods that selectively rotate during operation. In FIGS. 2 and 3, a first drive shaft 98 and a second drive shaft 100 are respectively provided for the first and second servo rotary actuators 94, 96.

The one or more connectors are installed and mechanically coupled between the motors 94, 96 and the hopper 52, and include an assembly of components and structures that convert the rotary motion of the first and second drive shafts 98, 100 into linear vertical movement of the hopper. The connectors can have different components and structures including a first and second transfer assembly 102, 104, a first and second bracket 106, 108, and a first and second support block 110, 112, as shown in of FIGS. 2 and 3. The first and second transfer assemblies 102, 104 can each include interengaging members such as meshing gears, threaded male and female members, sliding members, a rack and pinion assembly, or a combination thereof that interact with one another to convert the outputted rotary motion into precise linear vertical up and down movement. In FIGS. 2 and 3, a first and second outer casing 114 (only the first outer casing is shown in FIG. 2) is provided for each transfer assembly 102, 104 and houses the internal interengaging members thereof, and each transfer assembly converts the rotary motion to the linear motion over an orthogonal arrangement and extent. The first and second brackets 106, 108 are located vertically above the first and second transfer assembly 102, 104, and are directly engaged by and receive the vertical up and down movement outputted from the transfer assemblies. The brackets 106, 108 are mounted directly on the first and second support blocks 110, 112. The hopper 52 is in turn directly mounted on each of its sides to the first and second support blocks 110, 112, the support blocks can be mounted on rails or tracks for guided vertical movement, and gibs 113 can be provided to control the movement of the support blocks.

Still further, a controller 118 is provided for instructing and controlling operation of the one or more motors (in this case the first and second servo rotary actuators 94, 96) based on one or more properties sensed by the one or more sensing stations. The controller 118 may instruct and control the operation of the battery grid pasting system 10, of the battery grid pasting machine 16, or of both. The controller 118 can include a single controller or more than one controller. Further, the controller 118 can be an electronic controller including a programmable logic controller (PLC), a digital computer, a programmable microchip, or the like, that can automate operation of the first and second servo rotary actuators 94, 96 via an algorithm, executable code or program, or the like. The controller 118 is shown schematically in FIG. 2 with one or more electrical inputs 120 electrically coupled to or controlling the one or more sensing stations and with a first and second electrical output 122, 124 electrically coupled to the first and second servo rotary actuators 94, 96. Here, the electrical inputs 120 receive signals from the one or more sensing stations indicative of the one or more sensed properties. Depending on the sensed properties, the controller 118 can then make comparisons, perform calculations, utilize lookup tables, or process the data in another way, and if appropriate can send a control signal via the first and second electrical outputs 122, 124 to the first and second servo rotary actuators 94, 96 for varying the vertical extent of the space 88. The control signal actuates the servo rotary actuators 94, 96 to rotate the drive shafts 98, 100 in the clockwise and counterclockwise directions to vertically lift and lower the hopper 52.

Skilled artisans will appreciate that the battery grid pasting machine 16 can include yet additional components and constructions that support and provide its functionality and operation. For example, an entrance guide assembly 126 can be included that has a vertically declined plate for guiding the battery grids toward and onto the belt 50 and underneath the hopper 52. Also, as shown in FIG. 1, a first paper roller system 125 can be included for underlaying the battery grids with a paper film or material, a fiber glass material, a battery separator material, or the like, and a second paper roller system 127 can be included for overlaying the pasted battery grids with a paper film or material, a fiber glass material, a battery separator material, or the like. A human-machine-interface (HMI) or other type of control panel can be included for interacting with a machine operator such as on/off and manual cycling capabilities.

As previously mentioned, the automated control over paste application is ideal in battery technologies in which properties of pasted battery grids can have an impact on the performance of the ultimately-produced batteries. For example, in a sealed battery such as an AGM or VRLA battery, an electrolyte is absorbed in a fiber-glass mat separator assembled and placed between a pair of pasted battery grids or plates. The amount of electrolyte absorbed in the separators is dictated in part by the compression and squeezing of the separators by their sandwiching battery plates on each side. Properties such as the uniformity of pasted and cured battery grids, a battery plate's size, thickness, and weight can provide compression and squeezing to differing extents or forces thus causing differing amounts of electrolyte to be absorbed. And hence accurate and consistent paste application processes help regulate these properties and are sought and sometimes required in AGM batteries, VRLA batteries, and other sealed batteries to ensure that a suitable and desired amount of electrolyte is provided in the batteries. For example, if a battery plate is thicker than desired, it will compress and squeeze the accompanying fiber-glass mat separator to a greater extent, and the amount of electrolyte absorbed will be less than suited and desired for battery optimum performance and in-service useful life.

The battery grid pasting system 10 described herein provides automated paste application that is more accurate, precise, efficient, and consistent than previously known capabilities, and is therefore better suited for producing battery plates (pasted and cured grids) for AGM batteries and other sealed batteries. In operation in this embodiment, and referring now to FIG. 1, a procession of battery grids are transported in the battery grid pasting system 10 from the pick-up roller 14, through the battery grid pasting machine 16, to the cutter 18, through the flash drying oven 22, and eventually to the stacker station 26. Along the way, pasted battery grids pass through the one or more sensing stations where a value of a property of the pasted grids is sensed, and the value of the sensed property is transmitted to the controller 118 and compared to a predetermined desired reference value or range of reference values. Depending on the outcome of the comparison, if the sensed value is not the desired value or within the range of desired values, the controller 118 instructs and controls actuation of the servo rotary actuators 94, 96 to adjust the vertical height of the hopper 52 and hence the space 88 and the amount of paste applied to the battery grids. In this way, a closed-loop control system is provided for the battery grid pasting system 10. When the vertical extent of the space 88 is increased, the amount of paste applied is increased; and conversely, when the vertical extent of the space is decreased, the amount of paste applied is decreased. This also increases or decreases the applied paste weight.

For example, the thickness sensing station 30 of FIG. 1A takes a thickness measurement of a pasted battery grid, and the controller 118 then compares the thickness measurement to a predetermined reference thickness value. If the thickness measurement is determined by comparison to be less than the predetermined reference thickness value, more paste material should be applied in the battery grid pasting machine 16 in order to increase the thickness of the pasted battery grids. Thus, the servo rotary actuators 94, 96 are actuated, the hopper 52 is lifted vertically upward, the space 88 is increased, and more paste material is dispensed out of the dispensing end 86 and applied to the battery grids. Conversely, if the thickness measurement is greater than the predetermined reference thickness value, less paste material should be applied and the servo rotary actuators 94, 96 are actuated, the hopper 52 is lowered vertically downward, the space 88 is decreased, and less paste material is dispensed and applied to the grids. The predetermined reference thickness value can be established based on the amount of electrolyte desired to be absorbed in fiber-glass mat separators of the ultimately-produced batteries, so that maintaining the measured thicknesses at the predetermined reference thickness value helps ensure suitable compression and squeezing and the desired amount of electrolyte absorbed. In another example, the first weight sensing station 36 of FIG. 1B takes a weight measurement of a pasted battery grid, and the controller 118 compares the weight measurement to a predetermined reference weight value. Like before, if the weight measurement is less than the predetermined reference weight value, more paste material is applied to increase the weight of the pasted battery grids, and vice versa. Similar to the thickness, the weight can influence the amount of electrolyte absorbed in the associated fiber-glass mat separators.

The moisture sensing station 42 of FIG. 1C takes a moisture content measurement of a pasted and flash dried battery grid, and the controller 118 compares the moisture content measurement to a predetermined desired reference moisture content value or range of desired values. If the moisture content measurement is determined to be less than the predetermined desired reference moisture content value or outside of the range of desired values, the operating temperature of the flash drying oven 22 is adjusted to decrease the temperature that the pasted battery grids are flash dried and therefore keep more moisture in the paste. Conversely, if the moisture content measurement is determined to be greater than the predetermined desired reference moisture content value or outside of the range of desired values, the operating temperature of the flash drying oven 22 is adjusted to increase the temperature that the pasted battery grids are flash dried and therefore remove more moisture out of the paste.

Employing the battery grid pasting system 10 described herein can reduce paste material waste, and can therefore substantially reduce costs over time. In an example with a strip of battery grids having a pair of side-by-side grids (i.e., a right side grid and a left side grid), it is not uncommon for the hopper to have imperfect parallelism with the underlying conveying apparatus or belt and therefore with the passing battery grids. Even a hopper out of parallel by as little as one or two thousandths of an inch can produce a right or left side grid with one or two thousandths of an inch of paste material thicker than the other right or left side grid. Because these thickness variations between the right and left side grids are difficult to notice—if not altogether unnoticeable—by a human operator, the variations often persist over an extended period of time during manufacturing. The battery grid pasting system 10 described herein can remedy this imperfect and relatively minuscule parallelism and, depending on a number of parameters, can reduce costs by up to and over one million U.S. dollars per year. Table 1 gives an example right and left side battery grid having a difference in paste density and a difference in paste weight per one thousandth of an inch thickness variation of paste material. These differences are the result of imperfect parallelism between the hopper and the underlying conveying apparatus and passing battery grids. Table 2 provides the accompanying cost savings that can be achieved if these differences were remedied by the battery grid pasting system 10. As evident from Table 2, even though the imperfect parallelism may be slight, in this case 0.001 inches, the cost savings can be substantial when added up over a year. It should be appreciated that the parameters presented in the Tables 1 and 2 can vary, and therefore the cost savings can vary in kind.

TABLE 1

|  | Left Side Battery Grid | Right Side Battery Grid |
| --- | --- | --- |
| Grid Width (inches) | 5.625 | 5.625 |
| Grid Height (inches) | 4.25 | 4.25 |
| Thickness (inches) | 0.001 | 0.001 |
| Volume of 0.001 inch of Thickness | 0.02390625 | 0.02390625 |
| Paste Density (grams/cubic centimeter) | 72 | 68 |
| Paste Weight Variation (grams) per 0.001 inch Thickness Variation | 1.72 | 1.63 |
| Average Paste Weight Variation (grams) per 0.001 inch Thickness Variation | 1.67 | |

TABLE 2

| Cost of Lead per Pound (U.S. dollars) | $1.25 |
| --- | --- |
| Cost of Lead Paste per Pound (U.S. dollars) | $1.4375 |
| Speed of Continuous Pasting Machine (feet per minute) | 150 |
| Automotive Typical Number of Grids per Foot (Left and Right Battery Grids) | 4.27 |
| Pasted Plates Produced per Minute | 640 |
| Operating Minutes per 3 Shift Day at 80% Uptime | 1152 |
| Operating Days per Year | 300 |
| Plates Produced Annually per Pasting Machine | 221,184,000 |
| Automated Plate Thickness Control Improvement per Plate (inches) | 0.001 |
| Automated Paste Control Savings per Plate (grams) | 1.67 |
| Cost of Paste Saved per Plate (U.S. dollars) | $0.0053 |
| Cost Savings per Year Via Use of Battery Grid Pasting System Described Herein (U.S. dollars) | $1,171,966.52 |

Figure 4:
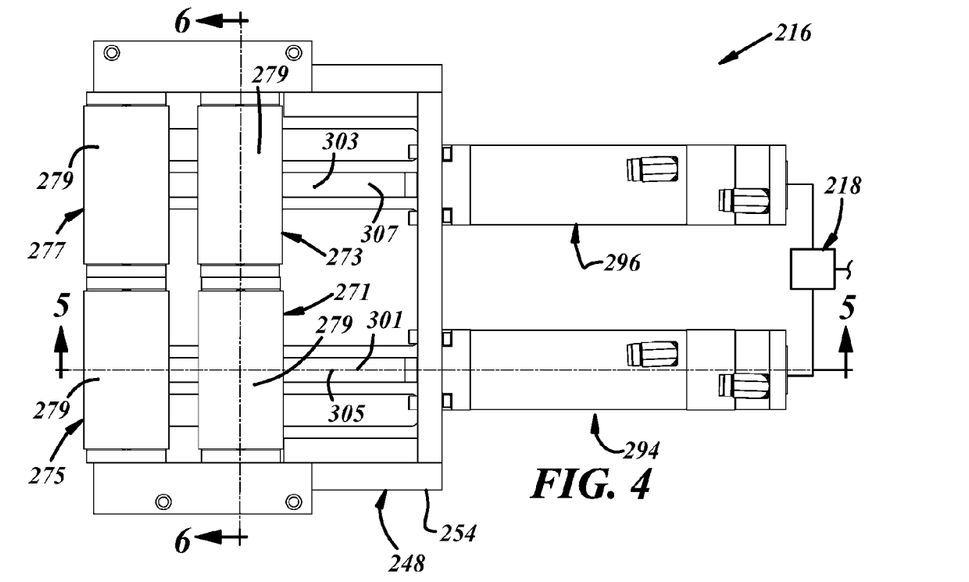
FIG. 4 is a top view of an embodiment of a part of a battery grid pasting machine of the battery grid pasting system of FIG. 1.
Figure 5:
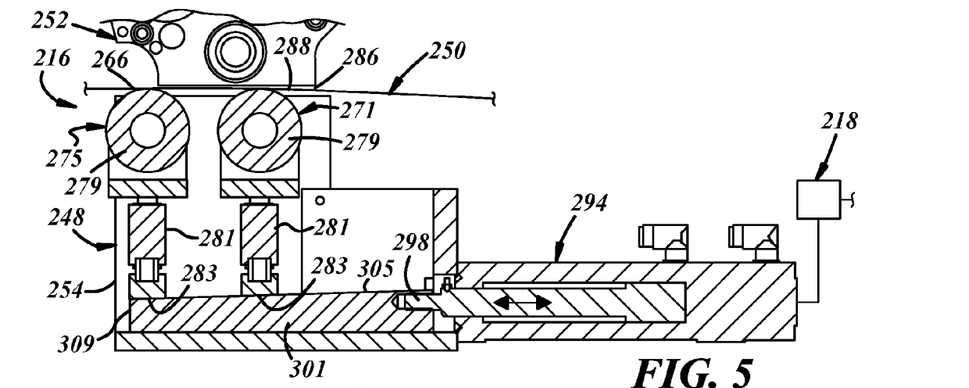
FIG. 5 is a sectional view of the battery grid pasting machine of FIG. 4 taken at arrowed line 5-5 in FIG. 4.
Figure 6:
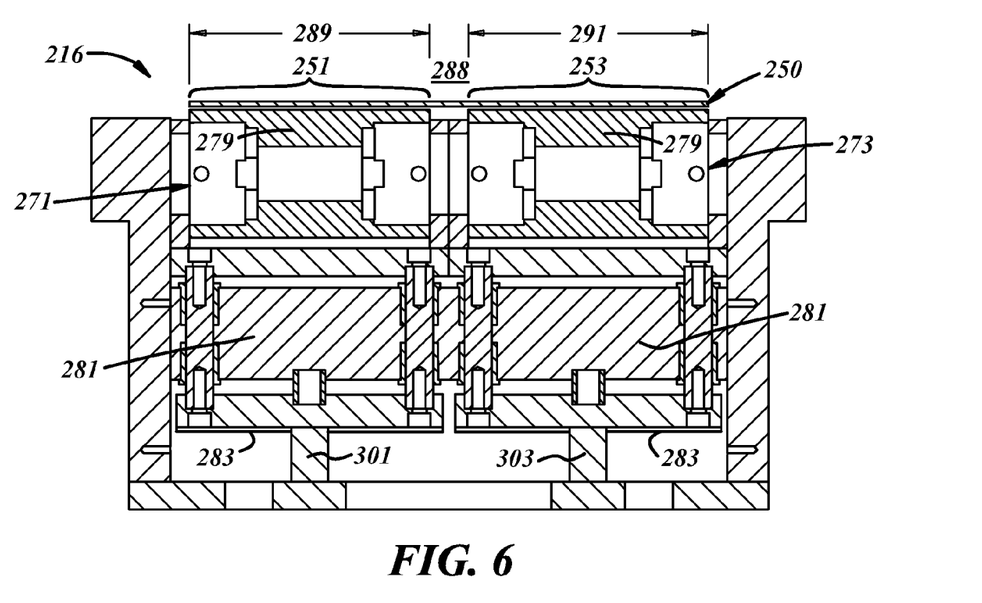
FIG. 6 is a sectional view of the battery grid pasting machine of FIG. 4 taken at arrowed line 6-6 in FIG. 4.

An alternative form of a battery grid pasting machine 216 is shown in FIGS. 4-6. The battery grid pasting machine 216 can be used in the battery grid pasting system 10 of FIG. 1, and has some similar components and functionality as the battery grid pasting machine 16 previously described. Like before, the pasting machine 216 provides automated closed loop control over the amount of paste material applied to the battery grids. But here, a space 288 is varied by adjusting the vertical height of rollers and a belt 250 supported thereon, instead of adjusting the vertical height of the hopper 52 as before. FIGS. 4-6 generally show a lower half of the pasting machine 216, and in particular show a base 254 of a frame 248. A hopper 252 is mounted vertically above an upper run 266 of the belt 250, and a dispensing end 286 directly confronts the upper run across the space 288. The belt 250 is supported and engaged vertically underneath and longitudinally at the dispensing end 286 by a first roller 271, a second roller 273, a third roller 275, and a fourth roller 277. A first lateral section 251 of the belt 250 is supported by the first and third rollers 271, 275, and a second lateral section 253 of the belt is supported by the second and fourth rollers 273, 277. The rollers 271, 273, 275, 277 are journaled for free rotation about shafts. Each of the rollers 271, 273, 275, 277 has roller bodies 279 that make direct contact with an underside of the belt 250, and each of the rollers has a roller stand 281 that serves as a base and support for the roller bodies. The roller stands 281 each have a surface 283 that directly abut against connectors, as shown in FIGS. 5 and 6.

In the pasting machine 216, a first servo linear actuator 294 is installed and located on the same lateral side as the first and third rollers 271, 275, and a second servo linear actuator 296 is installed and located on the same lateral side as the second and fourth rollers 273, 277. The first servo linear actuator 294 is mechanically coupled to the rollers 271, 275, and when actuated causes these rollers and the first lateral section 251 of the belt 250 to move vertically up and down and toward and away from the hopper 252 hence varying the vertical extent of a first lateral zone 289 of the space 288 in the vertically upward and downward directions between the belt and the hopper. The first lateral zone 289 is located vertically above the belt's first lateral section 251. In a similar way, the second servo linear actuator 296 is mechanically coupled to the rollers 273, 277, and when actuated causes these rollers and the second lateral section 253 of the belt 250 to move vertically up and down and toward and away from the hopper 252 hence varying the vertical extent of a second lateral zone 291 of the space 288 in the vertically upward and downward directions between the belt and the hopper. The second lateral zone 291 is located vertically above the belt's second lateral section 253. As will be known to skilled artisans, servo linear actuators generally include drive shafts or rods that selectively extend and retract during operation. As shown in FIG. 5, a first drive shaft 298 and a second drive shaft (not shown) extend and retract in the forward and reverse longitudinal directions.

Still referring to FIGS. 4-6, the connectors are installed and mechanically coupled between the servo linear actuators 294, 296 and the rollers 271, 273, 275, 277, and include a first ramped block or shoe 301 and a second ramped block or shoe 303 that convert the linear longitudinal motion of the first and second drive shafts 298, 300 into linear vertical movement of the rollers and the belt 250. The first ramped block 301 is connected directly to the first drive shaft 298 and is selectively extended and retracted in the forward and reverse longitudinal directions by the first servo linear actuator 294. Similarly, the second ramped block 303 is connected directly to the second drive shaft and is selectively extended and retracted in the forward and reverse longitudinal directions by the second servo linear actuator 296. A first ramped or inclined cam surface 305 of the first ramped block 301 makes surface-to-surface direct contact with the inclined follower surfaces 283 of the roller stands 281 of the first and third rollers 271, 275.

And a second ramped or inclined cam surface 307 of the second ramped block 303 makes surface-to-surface direct contact with the inclined follower surfaces 283 of the roller stands 281 of the second and fourth rollers 273, 277. Referring in particular to FIG. 5, both of the first and second ramped surfaces 305, 307 are declined or constantly sloped vertically downward from a point of connection with the first and second drive shafts 298, 300 toward a free end 309 of the first and second ramped blocks 301, 303. The surfaces 283 are complementarily sloped for a surface-to-surface contact with the ramped surfaces 305, 307. In other forms, for example, these contacting surfaces could be inclined, or could make contact in different ways.

A controller 218 is provided in this embodiment which is similar to the previously-described controller for instructing and controlling operation of the first and second servo linear actuators 294, 296 based on the value of the one or more sensed properties of the one or more sensing stations via a closed loop control regime. In operation, the first and second servo linear actuators 294, 296 can be separately and independently actuated, or can be simultaneously actuated together. When the first servo linear actuator 294 is actuated and the first drive shaft 298 moves forward, for example, the first ramped surface 305 of the first ramped block 301 slides against the surfaces 283 for the first and third rollers 271, 275, and the first and third rollers are moved vertically upward in unison to the same extent. The vertical extent of the first lateral zone 289 of the space 288 above the first and third rollers 271, 275 is thus decreased. If the strip of battery grids is in the form of laterally side-by-side battery grids, then one side of the strip will have less paste material applied to it than the other side, unless the second servo linear actuator 296 is also actuated in the same way to decrease the vertical extent of the second lateral zone 291 of the space 288.

Figure 7:
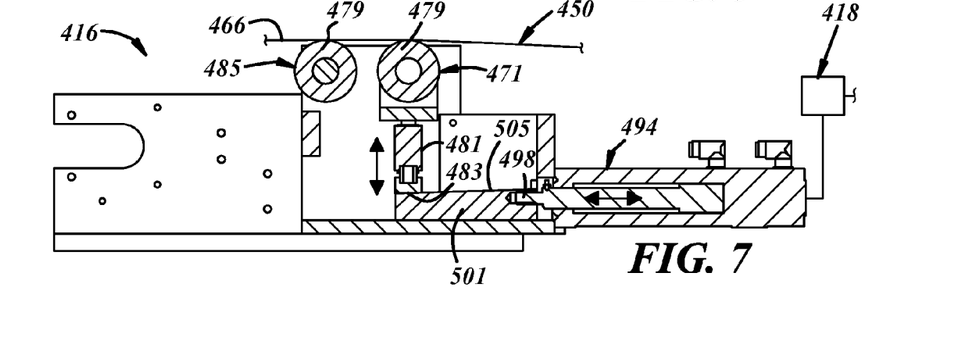
FIG. 7 is a sectional view similar to that of FIG. 5 but of a modified form of a part of a battery grid pasting machine of the battery grid pasting system of FIG. 1.

FIG. 7 shows another alternative form of a battery grid pasting machine 416. The battery grid pasting machine 416 can be used in the battery grid pasting system 10 of FIG. 1, and has similar components and functionality as the battery grid pasting machine 216 previously described. Like before, the pasting machine 416 provides automated control over the amount of paste material applied to the battery grids. But here, not all of the rollers are automatically vertically adjustable and instead one roller 485 is furnished for manual vertical adjustment by the machine operator. Although not all shown, a hopper is mounted vertically above an upper run 466 of a belt 450 and a dispensing end of the hopper directly confronts and is spaced vertically above the upper run across a space. The belt 450 is supported and engaged vertically underneath and longitudinally at the dispensing end by a first roller 471, a second roller (not shown, but coaxial with and laterally spaced from and next to the first roller as in the embodiment of FIG. 4), and the third roller 485. A first lateral section of the belt 450 is supported by the first roller 471, and a second lateral section of the belt is supported by the second roller. The third roller 485 has a lateral extent that is the same as that of the first and second rollers taken together, and therefore the third roller supports both the first and second lateral sections of the belt 450. All of the rollers are journaled for free rotation about shafts, and each has roller bodies 479 that make direct contact with an underside of the belt 450. The first and second rollers have roller stands 481 that serve as a base and support for the rollers bodies, and the roller stands have follower surfaces 483 directly abutting connectors. The third roller 485, in contrast, is supported and journaled by a shaft adjustably mounted to a frame of the battery grid pasting machine 416 so that the third roller can be manually vertically raised and lowered by the machine operator.

A first servo linear actuator 494 is installed and located on the same lateral side as the first roller 471, and a second servo linear actuator is installed and located on the same lateral side as the second roller. The first servo linear actuator 494 is mechanically coupled to the first roller 471, and when actuated causes the roller and the first lateral section of the belt 450 to move vertically up and down and toward and away from the hopper hence varying the vertical extent of a first lateral zone of the space in the vertically upward and downward directions between the belt and the hopper. In a similar way, the second servo linear actuator is mechanically coupled to the second roller, and when actuated causes the roller and the second lateral section of the belt 450 to move vertically up and down and toward and away from the hopper hence varying the vertical extent of a second lateral zone of the space in the vertically upward and downward directions between the belt and the hopper. A first drive shaft 498 of the first servo linear actuator 494 and a second drive shaft of the second servo linear actuator extend and retract in the forward and reverse longitudinal directions.

Still referring to FIG. 7, the connectors are installed and mechanically coupled between the first and second servo linear actuators and the first and second rollers, and include a first ramped block or shoe 501 and a second ramped block or shoe (on the first ramped block is shown in FIG. 7) that convert the linear longitudinal motion of the first and second drive shafts into linear vertical movement of the rollers and the belt 450. The first ramped block 501 is connected directly to the first drive shaft 498 and is selectively extended and retracted in the forward and reverse longitudinal directions by the first servo linear actuator 494. Similarly, the second ramped block is connected directly to the second drive shaft and is selectively extended and retracted in the forward and reverse longitudinal directions by the second servo linear actuator. A first ramped or inclined cam surface 505 of the first ramped block 501 makes surface-to-surface direct contact with the follower surface 483 of the roller stand 481 of the first roller 471. And a second ramped or inclined cam surface of the second ramped block makes surface-to-surface direct contact with the follower surface of the roller stand of the second roller. The third roller 485 does not interact with the servo linear actuators or the connectors.

As before, a controller 418 is provided for instructing and controlling operation of the first and second servo linear actuators based on the value of one or more sensed properties of the one or more sensing stations via a closed loop control regime. In operation, the first and second servo linear actuators can be separately and independently actuated, or can be simultaneously actuated together.

Figure 8:
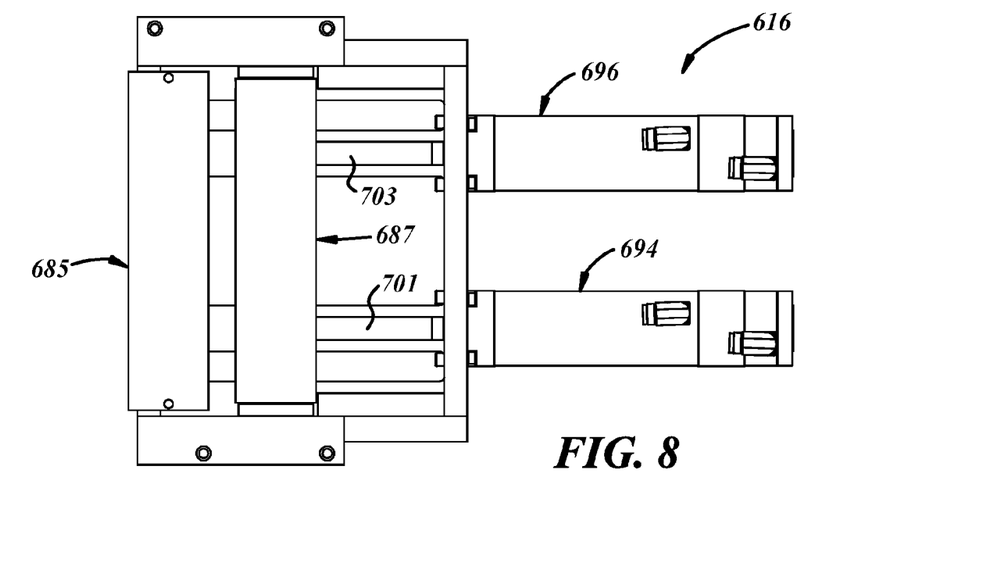
FIG. 8 is a top view similar to that of FIG. 4 but of a modified form of a part of a battery grid pasting machine of the battery grid pasting system of FIG. 1.

FIG. 8 shows yet another alternative form of a battery grid pasting machine 616. The battery grid pasting machine 616 has similar components and functionally as the battery grid pasting machine 416 previously described. Like before, the pasting machine 616 provides automated closed loop control over the amount of paste material applied to the battery grids. But here, a single roller with automatic vertical adjustment is provided instead of two laterally side-by-side rollers like the first and second rollers of FIG. 7. Referring to FIG. 8, a belt is supported and engaged vertically underneath by a first roller 687 and a second roller 685. The first and second rollers 687, 685 have the same lateral extent, and therefore the battery grid pasting machine 616 is suitable for a strip of battery grids with grids arranged in a single row and not laterally side-by-side. A first and a second servo linear actuator 694, 696 are mechanically coupled to the first roller 687 via connectors, and when actuated causes the first roller to move vertically up and down in order to vary the vertical extent of a space between the belt and a hopper. The connectors include a first ramped block or shoe 701 and a second ramped block or shoe 703 that convert the linear longitudinal motion of the first and second servo linear actuators 694, 696 into linear vertical movement of the first roller 687 and belt. The second roller 685 does not interact with the servo linear actuators 694, 696 or the connectors, and, like the third roller 485 of FIG. 7, can be manually vertically raised and lowered by the machine operator.

Figure 10:
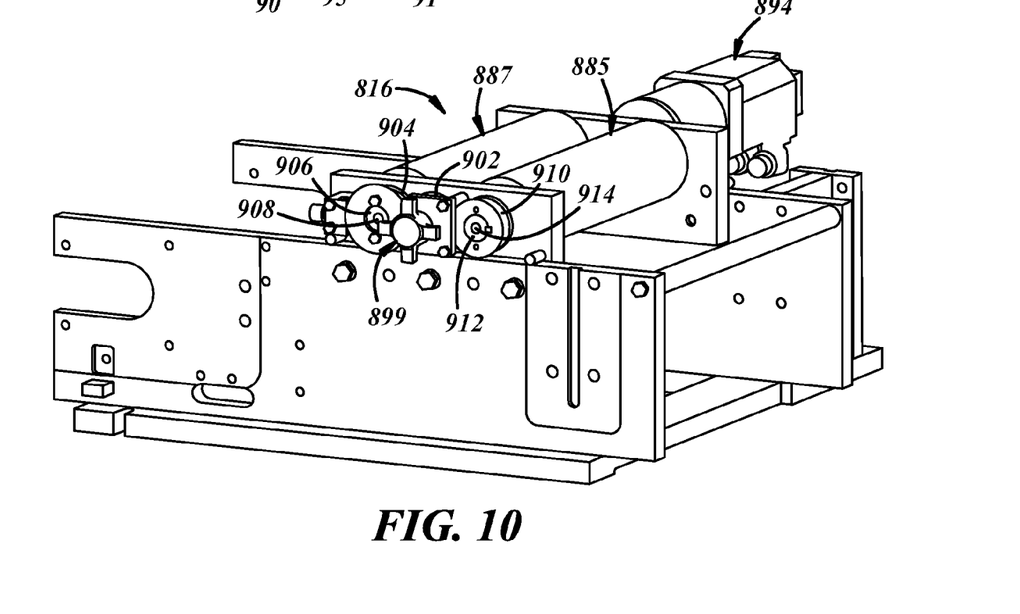
FIG. 10 is a perspective view of another embodiment of a part of a battery grid pasting machine of the battery grid pasting system of FIG. 1.
Figure 11:
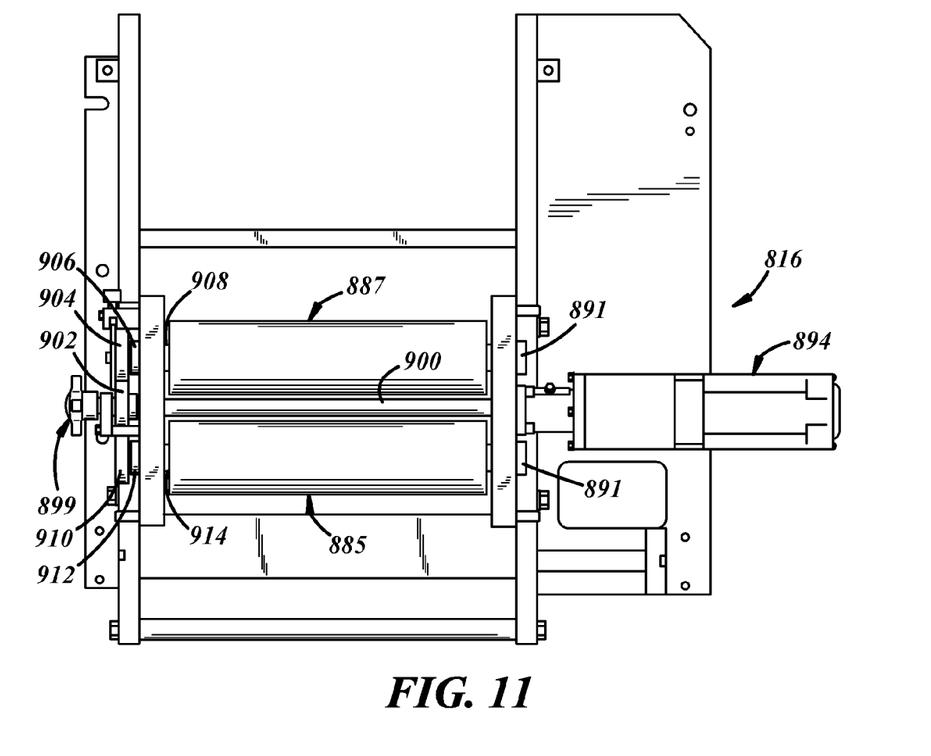
FIG. 11 is a top view of the part of the battery grid pasting machine of FIGS. 10.
Figure 12:
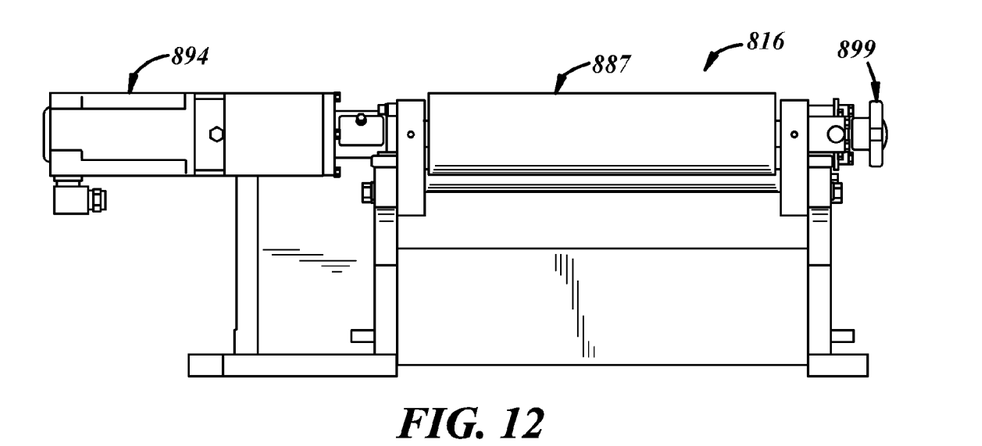
FIG. 12 is a front view of the part of the battery grid pasting machine of FIG. 10.

FIGS. 10-12 show yet another alternative form of a part of a battery grid pasting machine 816. The battery grid pasting machine 816 has some similar components and functionality as the battery grid pasting machines previously described. Like before, the pasting machine 816 provides automated closed loop control over the amount of paste material applied to the battery grids passing through it. But here, a single servo rotary actuator 894 when actuated causes the first and second rollers 887, 885 to move concurrently substantially vertically up and down in order to vary the vertical extent of a space between a belt overlaying the rollers and a hopper (belt and hopper not shown). The servo rotary actuator 894 may have an integral gear box and a drive shaft, as will be known to skilled artisans. The mechanism between the drive shaft of the servo rotary actuator 894 for raising and lowering the rollers 887, 885 can take various designs and constructions and can have various components. In one example, the servo actuator is a reversible stepper motor that rotates a drive shaft 900 with a gear 902 fixed near its other end that meshes with a first gear 904 fixed on an offset portion 906 of a first shaft 908 on which the first roller 887 freely rotates, and also meshes with a second gear 910 fixed an offset portion 912 of a second shaft 914 on which the second roller 885 freely rotates. Other examples can include drive train assemblies with chains, sprockets, and other components.

In order for the first and second rollers 887, 885 to be generally vertically raised and lowered, the shafts 908, 914 each have cylindrical offset portions 906, 912 respectively adjacent their opposed ends and journaled in bearing assemblies 891 so that rotation of the shafts 908, 914 raises and lowers their associated rollers 887, 885. The cylindrical offset portions 906, 912 are eccentric with respect to the axis of the central portion of each shaft 908, 914 on which its associated roller 887, 885 freely rotates when engaged by the moving belt. In one specific example, the offset portions 906, 912 of each shaft 908, 914 are set off radially by a distance of 0.015-0.020 inches; other offset distances are possible. In this way, the central portion of each shaft 908, 914 carrying the first and second rollers 887, 885 is moved in an arcuate path clockwise and counterclockwise, to raise and lower vertically the rollers, and laterally come closer together and farther apart.

Opposite the servo rotary actuator 894, a hand knob 899 can be fixed to the drive shaft 900 in order for an operator to manually vertically raise and lower the rollers instead of doing so via the servo rotary actuator.

While the forms of the invention herein disclosed constitute exemplary forms and embodiments, many others are possible. It is not intended herein to mention all the possible equivalent forms or ramifications of the invention. The terms used herein are merely descriptive, rather than limiting, and various changes may be made without departing from the spirit or scope of the invention.

The invention claimed is:

1. A battery grid pasting system, the system comprising:
a battery grid pasting machine comprising:
 a frame;
 a hopper located at said frame, said hopper having a dispensing end with an orifice plate having an orifice that dispenses battery paste;
 a conveying apparatus having a continuous belt of a metal material supported at least in part by said frame, having an upper run confronting and extending laterally across said orifice of said dispensing end of said hopper and across a space between them, said belt carrying battery grids through said space to receive battery paste from said orifice of said dispensing end; and
 at least one roller underlying the upper run of the belt carrying battery grids, underlying and extending axially across the orifice and generally vertically movable relative to the orifice plate to vary the generally vertical extent of the space between the orifice and an underlying portion of the upper run of belt to control the thickness of the battery paste applied to the battery grids;
 a motor operably connected with the at least one roller to move such roller relative to the orifice plate to vary the generally vertical extent of the space between the orifice and the portion of the upper run of the belt underlying the orifice to control the thickness of the battery paste received on the carried battery grids;
 a sensing station located downstream of said hopper with respect to the direction of travel of the carried battery grids, said sensing station sensing a value of at least the thickness of the battery paste of a pasted battery grid; and
 a controller electrically coupled to said motor and electrically coupled to said sensing station, said controller receiving said sensed value and controlling actuation of said motor based at least in part thereupon in order to vary said generally vertical extent of said space and hence vary the amount of battery paste received on the carried battery grids.

2. The battery grid pasting system of claim 1, wherein said battery grid pasting machine further comprises a connector coupled to said roller, said motor coupled to said connector and upon actuation causing variance of said generally vertical extent of said space via movement of said connector and said roller.

3. The battery grid pasting system of claim 2, wherein said motor includes a servo rotary actuator, said connector includes a first shaft that is rotated by said servo rotary actuator, and said roller spins about a second shaft when engaged by said belt, said first and second shafts located offset with respect to each other so that actuation of said servo rotary actuator causes variance of said generally vertical extent of said space via movement of said roller.

4. The battery grid pasting system of claim 2, wherein said roller has a first surface and said connector has a second surface, said first surface, said second surface, or both being ramped wherein, upon actuation of said motor, movement of said first and second surfaces against each other causes variance of said generally vertical extent of said space.

5. The battery grid pasting system of claim 1, wherein said motor includes a first servo linear actuator and a second servo linear actuator, said at least one roller comprising a first roller supporting a first section of said upper run of said belt and underlying part of said orifice, a second roller supporting a second section of said upper run of said belt and underlying part of said orifice, a first connector coupled to said first roller, and a second connector coupled to said second roller, said first servo linear actuator coupled to said first connector and upon actuation causing variance of the generally vertical extent of a first zone of said space between said belt and said orifice via movement of said first connector and said first roller, and said second servo linear actuator coupled to said second connector and upon actuation causing variance of the generally vertical extent of a second zone of said space between said belt and said orifice, via movement of said second connector and said second roller.

6. The battery grid pasting system of claim 5, further comprising a third roller supporting said first and second sections of said upper run of said belt said third roller positioned upstream or downstream of said first and second rollers and being free of a coupling to said first and second servo linear actuators.

7. The battery grid pasting system of claim 5, further comprising a third roller supporting said first section of said upper run of said belt and coupled to said first connector, a fourth roller supporting said second section of said upper run of said belt and coupled to said second connector, actuation of said first servo linear actuator causing variance of said generally vertical extent of said first zone of said space via movement of said first connector and said first and third rollers, and actuation of said second servo linear actuator causing variance of said generally vertical extent of said second zone of said space via movement of said second connector and said second and fourth rollers.

8. The battery grid pasting system of claim 1, wherein said motor includes a first servo rotary actuator and a second servo rotary actuator, said battery grid pasting machine further comprising a first connector coupled to said hopper and a second connector coupled to said hopper, said first servo rotary actuator coupled to said first connector and said second servo rotary actuator coupled to said second connector, actuation of said first and second servo rotary actuators causing variance of the generally vertical extent of said space via movement of said first and second connectors and said hopper.

9. The battery grid pasting system of claim 8, wherein said first and second connectors each include a transfer assembly with interengaging members that convert the outputted rotary motion of said first and second servo rotary actuators into substantially linear movement of said hopper.

10. The battery grid pasting system of claim 1, further comprising an oven located downstream of said hopper and a weight sensing station located downstream of the oven, and said weight sensing station sensing a weight value of a pasted battery grid, said controller electrically coupled to both said thickness and weight sensing stations.

11. The battery grid pasting system of claim 1, further comprising an oven located downstream of said hopper and a moisture sensing station located downstream of the oven and sensing a moisture content value of a pasted battery grid, said moisture sensing station electrically coupled to said controller in order to send the sensed moisture content value to said controller, said controller controlling operation of the oven based on the sensed moisture content value.

12. The battery grid pasting system of claim 1, further comprising an oven of the battery grid pasting system located downstream of the hopper, a first weight sensing station located downstream of said thickness sensing station and located upstream of the oven, and a second weight sensing station located downstream the oven, said controller electrically coupled to all of said thickness, first weight, and second weight sensing stations.

13. The battery grid pasting system of claim 1, further comprising a weight sensing station sensing a weight value of a pasted battery grid.

14. The battery grid pasting system of claim 1, wherein said controller receives said sensed value, compares said sensed value to a predetermined reference value, and controls actuation of said motor based at least in part upon the comparison.

15. A battery grid pasting system, the system comprising:
a battery grid pasting machine comprising:
   a frame;
   a hopper located at said frame, said hopper having a dispensing end that dispenses battery paste;
   a conveying apparatus supported at least in part by said frame and confronting said dispensing end of said hopper across a space, said conveying apparatus carrying battery grids through said space to receive battery paste from said dispensing end; and
   a motor actuatable to cause variance of said space and hence variance of the amount of battery paste received on the carried battery grids;
a first servo linear actuator and a second servo linear actuator, comprising a first roller supporting a first section of said conveying apparatus, a second roller supporting a second section of said conveying apparatus, a first connector coupled to said first roller, and a second connector coupled to said second roller, said first servo linear actuator coupled to said first connector and upon actuation causing variance of a first zone of said space via movement of said first connector and said first roller, and said second servo linear actuator coupled to said second connector and upon actuation causing variance of a second zone of said space via movement of said second connector and said second roller,
a third roller supporting said first and second sections of said conveying apparatus, said third roller positioned upstream or downstream of said first and second rollers and being free of a coupling to said first and second servo linear actuators;
a sensing station located downstream of said battery grid pasting machine with respect to the direction of travel of the carried battery grids, said sensing station sensing a value of a property of a pasted battery grid; and
a controller electrically coupled to said motor and electrically coupled to said sensing station, said controller receiving said value of the sensed property and controlling actuation of said motor based at least in part thereupon in order to vary said space and hence vary the amount of battery paste received on the carried battery grids.

16. A battery grid pasting system, the system comprising:
a battery grid pasting machine comprising:
   a frame;
   a hopper located at said frame, said hopper having a dispensing end that dispenses battery paste;
   a conveying apparatus supported at least in part by said frame and confronting said dispensing end of said hopper across a space, said conveying apparatus carrying battery grids through said space to receive battery paste from said dispensing end; and
   a motor actuatable to cause variance of said space and hence variance of the amount of battery paste received on the carried battery grids;
a first servo linear actuator and a second servo linear actuator, a first roller supporting a first section of said conveying apparatus, a second roller supporting a second section of said conveying apparatus, a first connector coupled to said first roller, and a second connector coupled to said second roller, said first servo linear actuator coupled to said first connector and upon actuation causing variance of a first zone of said space via movement of said first connector and said first roller, and said second servo linear actuator coupled to said second connector and upon actuation causing variance of a second zone of said space via movement of said second connector and said second roller, a third roller supporting said first section of said conveying apparatus and coupled to said first connector, a fourth roller supporting said second section of said conveying apparatus and coupled to said second connector, actuation of said first servo linear actuator causing variance of said first zone of said space via movement of said first connector and said first and third rollers, and actuation of said second servo linear actuator causing variance of said second zone of said space via movement of said second connector and said second and fourth rollers;

a sensing station located downstream of said battery grid pasting machine with respect to the direction of travel of the carried battery grids, said sensing station sensing a value of a property of a pasted battery grid; and a controller electrically coupled to said motor and electrically coupled to said sensing station, said controller receiving said value of the sensed property and controlling actuation of said motor based at least in part thereupon in order to vary said space and hence vary the amount of battery paste received on the carried battery grids.

* * * * *